Sept. 20, 1971  H. J. GERRITSEN  3,605,594
THREE DIMENSIONAL OPTICAL PHOTOGRAPHY PROJECTION SYSTEM
Filed Aug. 22, 1968  4 Sheets-Sheet 3

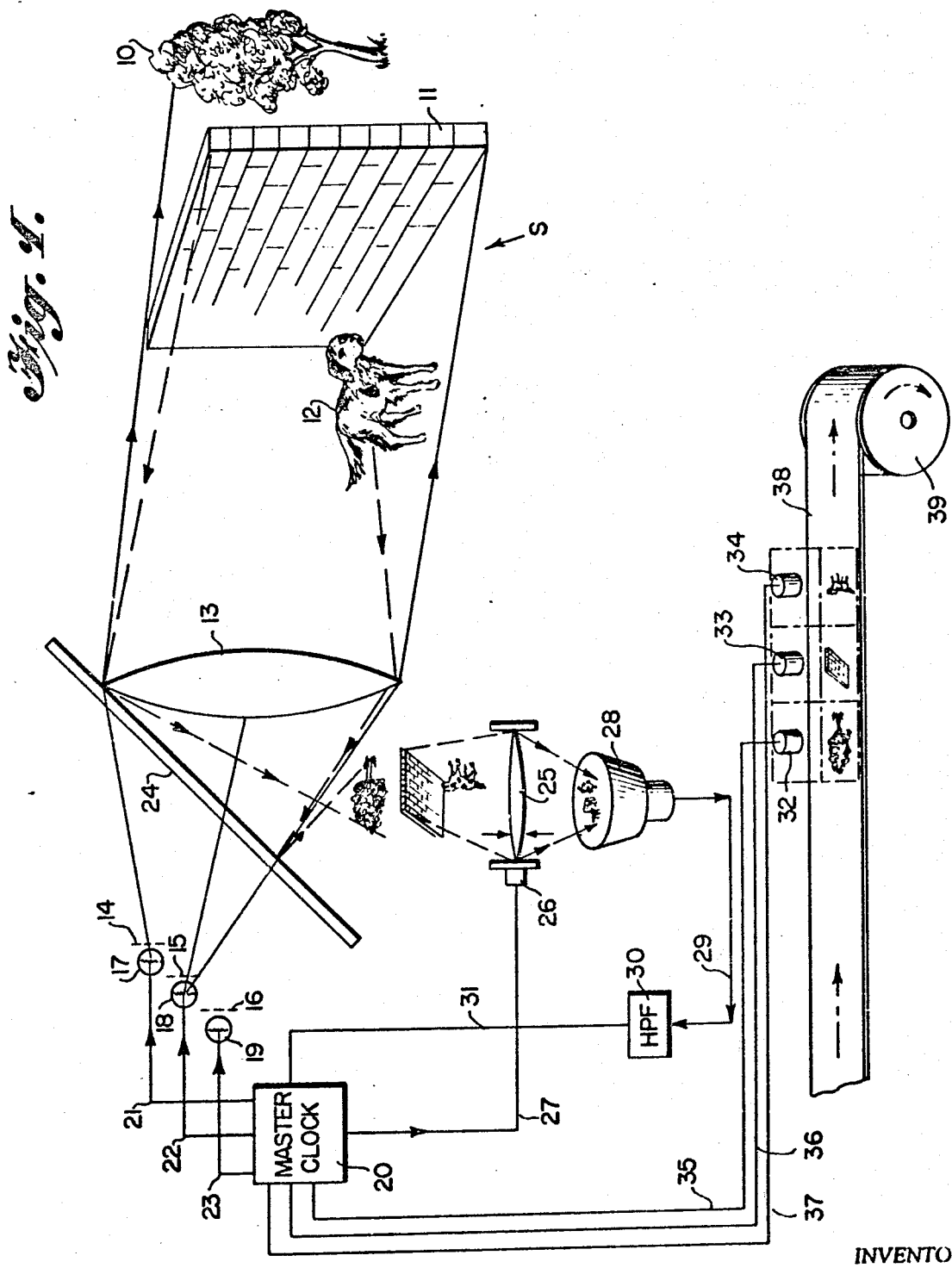

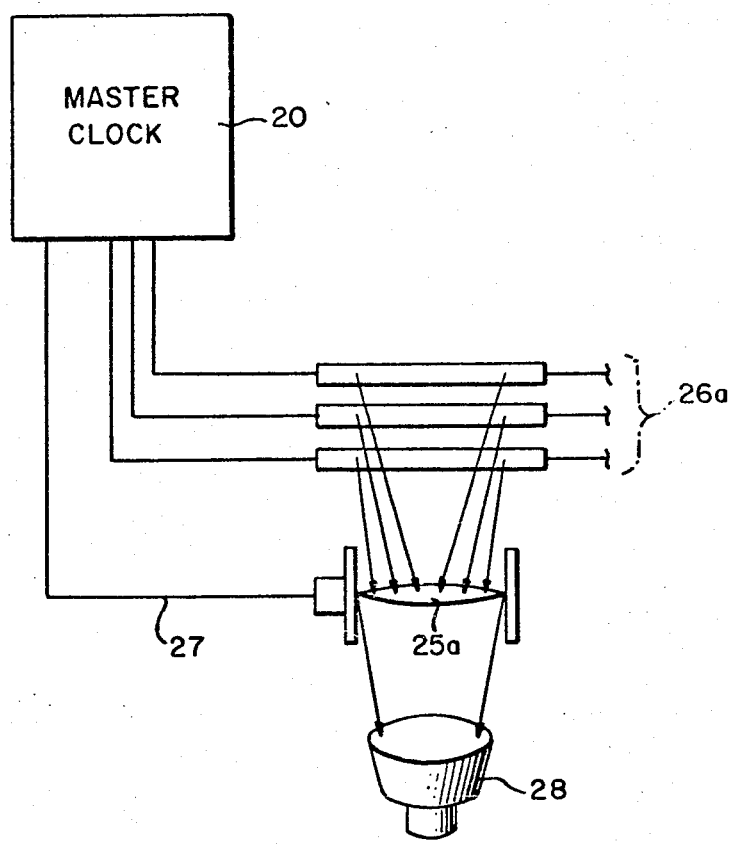

INVENTOR
HENDRIK J. GERRITSEN

BY William F. Werner
ATTORNEY

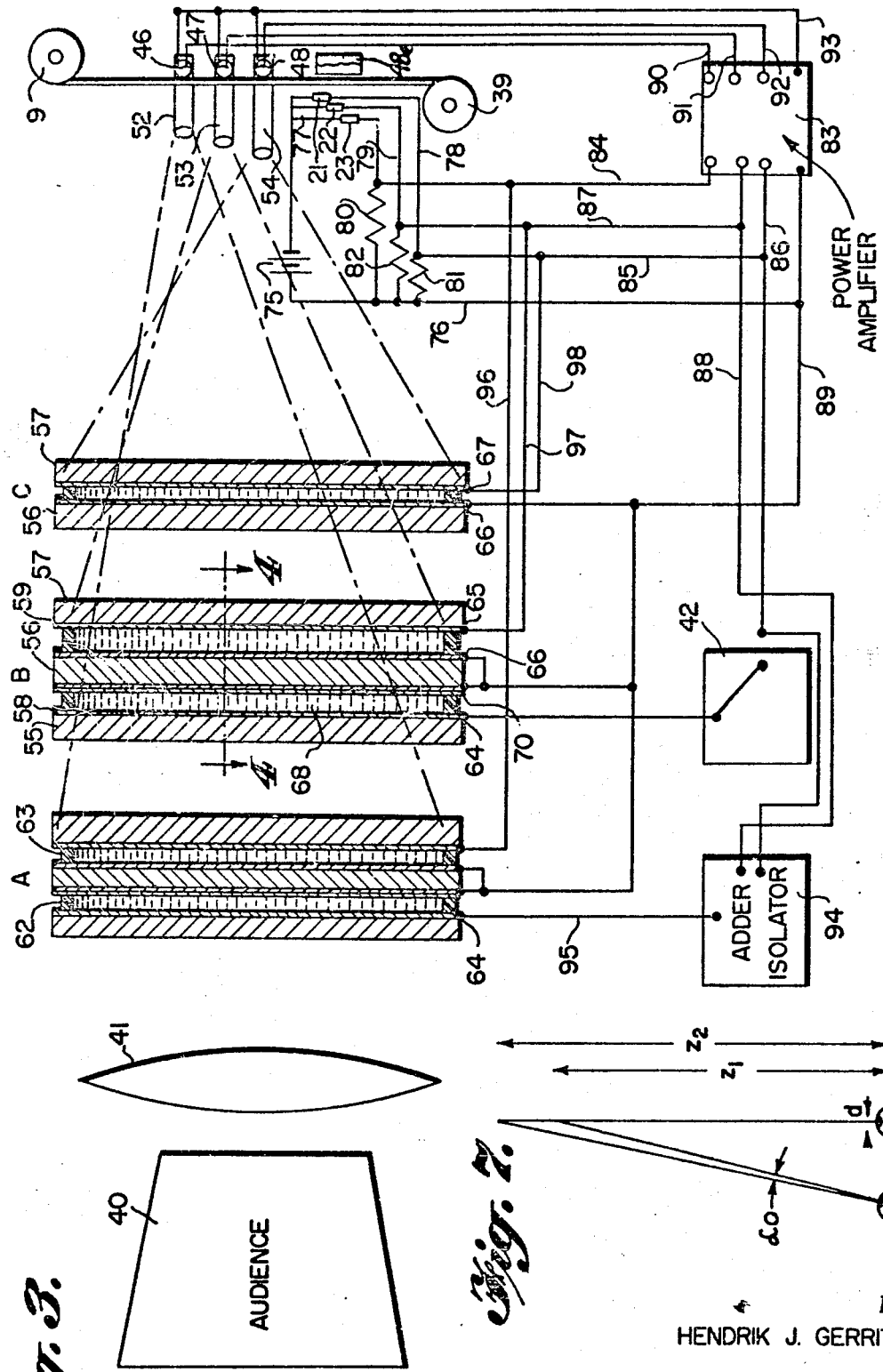

United States Patent Office 3,605,594
Patented Sept. 20, 1971

3,605,594
THREE DIMENSIONAL OPTICAL PHOTOGRAPHY PROJECTION SYSTEM
Hendrik Jurjen Gerritsen, 11 Halsey St., Providence, R.I. 02916
Filed Aug. 22, 1968, Ser. No. 754,543
Int. Cl. G03b 35/02, 35/16
U.S. Cl. 95—18                    15 Claims

ABSTRACT OF THE DISCLOSURE

The present specification discloses a three dimensional optical projection system which comprises two basic components. The first is the apparatus for taking cross sectional areas of a scene at different distances from the picture taking equipment and recording these cross sections on a suitable medium such as a film. The second component is the apparatus for projecting the recorded images on a plurality of screens arranged in depth, with each screen having the capability of being either transparent or light scattering to the extent necessary to having an image reproduced thereon. The recorded images are projected on these screens in proper sequential order so that they reproduce the original scene in three dimensions.

---

The present invention relates to optical projection systems and is concerned primarily with a novel system which projects, in proper sequential order, a series of cross sectional areas of a scene onto a series of screens arranged in depth to correspond to the aforesaid cross sectional areas, with only one screen at any instant being effective to reproduce a particular cross section while the remaining screens are transparent to permit light to pass therethrough. Thus each screen is visible from the viewing location and projected light can reach each screen. As will be clear from the following, the array of screens comprises also one way of obtaining optical cross sections in the recording apparatus.

It will be understood that the present invention may be used in conjunction with a single fixed scene, a plurality of such scenes as are required in the making and projection of motion pictures, and television broadcasting and reception.

The invention recognizes that much inventive and development work has been carried out in the field of three dimensional optics, such as stereoscopy etc., that is most of it in areas other than that of true depth devices, such as the present invention. Some effort has been directed to the end of reproducing a scene in depth. However, the desired result has not been obtained to the degree desired due to the limitation of the known equipment to record and reproduce the number of cross sections of a scene necessary to provide a good three dimensional effect.

This invention is founded on the belief that the desired depth effect can be obtained if the number of cross sectional areas of any scene is in excess of two and preferably is in the order of from five to fifty. Moreover, when it is considered that good definition in motion pictures requires about thirty-two frames per second, it will be understood that the scene taking and projection system of this invention must be capable of the rapid operation necessary to accommodate such conditions.

The invention has in view, as a highly important object, the provision of apparatus which photographs and records on a medium such as film, and in proper sequential order, a plurality of cross sections of a scene with the number of such cross sections being determined by the number necessary to afford a good depth effect.

A corollary object is to provide picture recording apparatus of the character noted which is susceptible of operation at the speed required for the taking of motion pictures and the transmittal of television.

Various other more detailed objects and advantages of the invention are related to the carrying out of the foregoing objectives in a practical embodiment. These will in part become apparent and in part be hereinafter stated as the description of the invention proceeds.

Another highly important object is to provide projecting apparatus which projects a plurality of cross sectional images onto a series of screens arranged in depth with each screen being either transparent or light scattering and means for rendering each screen light scattering at the proper moment to have a cross section projected thereonto.

This capability is important. Thus another object is to provide, in a three dimenisonal optical system of the type noted, a plurality of liquid crystal screens, each of which may be rendered light scattering by impressing a voltage thereacross, together with operating connections controlling said screens and which connections are co-related to the projecting apparatus.

Other objects and advantages related to the projecting apparatus will also become apparent as the description proceeds.

For a full and more complete understanding of the invention reference may be had to the following description and accompanying drawings wherein:

FIG. 1 is a schematic view, with parts shown in perspective, of photographing and recording apparatus designed in accordance with the precepts of this invention.

FIG. 1a is a diagrammatic illustration of the arrangement of the liquid crystal screens and image tube coacting therewith.

FIG. 3 is a diagrammatic view similar to FIG. 2 illustrating the screens on an enlarged scale and in more detail.

FIG. 7 is a diagrammatic representation of the calculations employed in determining the number of screens required in any particular case.

PHOTOGRAPHING AND RECORDING APPARATUS

Figure 2:
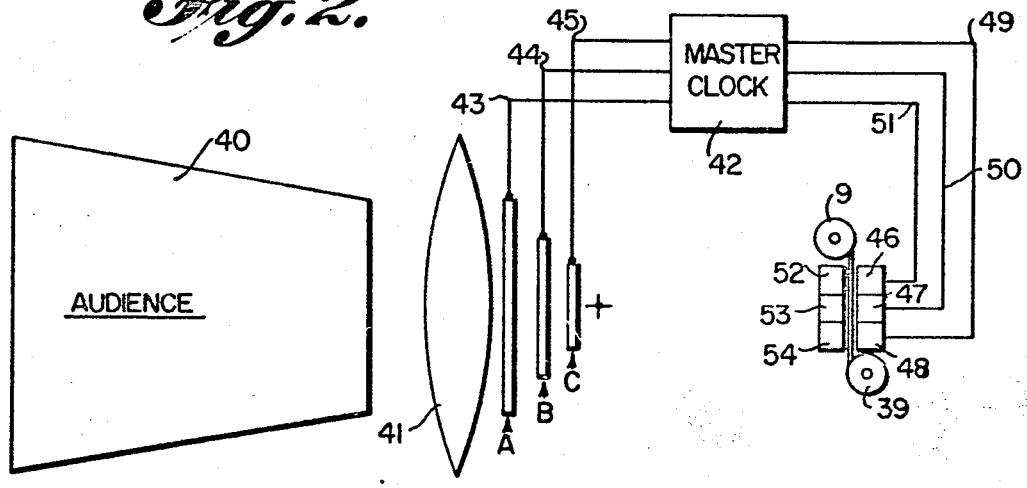
FIG. 2 is a diagrammatic view of projecting apparatus for projecting images recorded by the apparatus of FIG. 1.

Referring now to the drawings, and first more particularly to FIG. 1, the apparatus for taking pictures of and recording different cross sections of a scene will be described. It is notable that FIG. 1 depicts only three such cross sections and apparatus commensurate with this number. This is done to, as far as possible, reduce this specification to the epitome of simplicity. It is to be clearly understood that in actual practice the number of such cross sections will be in the order of from five to fifty. The term "Cross Section" is used in a generic sense including not only flat cross sectional planes but curved ones as well.

The scene to be photographed is identified in its entirety by the reference character S. It comprises a tree at one depth or cross section 10, a wall at a cross section 11, and a dog at cross section 12.

It is, of course, impossible to see or photograph through an object. It is, however, possible to make an object at a given distance from a camera lens distinct while all objects at other distances are indistinct or fuzzy. Thus in a conventional camera only one depth is sharply delineated while the other depths are fuzzy. There is also known a camera in which the lens moves as the shutter opens and all depths are focused and show up in sharp outline on the film.

A large illuminating lens is shown at 13 and is properly related to the scene S. On the side of the lens 13 remote from the scene S are three fine light screens 14, 15, and 16. A stroboscopic light 17 is positioned behind the screen 14, another strobe light 18 behind the screen 15, and another strobe light 19 behind the screen 16.

A master clock is shown at 20. A line 21 extends from the clock 20 to the strobe light 17, another line 22 to the strobe light 18, and still another line 23 to the strobe light 19. The master clock serves to energize these strobe lights in proper sequential order.

A so-called beam splitter is depicted at 24. It comprises a piece of transparent material such as glass with one half silvered to impart reflecting properties thereto. It is evident that light from any of the strobes 17, 18 or 19 passes through the unsilvered portion of the beam splitter and is focused by the lens 13 onto the particular cross section 10, 11 or 12 which is to be illuminated thereby.

It is also possible to use as beam splitter 24 a transparent material such as glass on which a thin reflective coating has been applied so that part of the light of the strobes is transmitted and part of the light from the scene is reflected by it. This light is then reflected by the object at the cross section back through the lens 13 and onto the reflecting portion of the beam splitter 24.

This reflected light is directed onto a lens 25 which is comparable to the camera lens above mentioned and which is movable in the back and forth directions indicated by the arrows. This movement is caused by a transducer 26 which is connected by a line 27 with the master clock 20. Thus the position of the lens 25 is co-related to the particular strobe light which is effective at any one time.

The lens 25 focuses the light onto an image tube 28. As such, an image tube, an orthicon or vidicon may be utilized. From the image tube 28 a line 29 goes to a high frequency pass filter 30 and from the latter a line 31 extends to the master clock 20.

Three kinescopes of the fast type are shown at 32, 33 and 34. A line 35 conductively connects the kinescope 32 to the line 31 through the master clock 20. Another line 36 similarly connects the kinescope 33 to the line 31 and still another line 37 connects the kinescope 34 to the line 31 through the master clock.

A film 38 is shown as passing through the kinescopes 32, 33 and 34 and taken up on a spool 39.

The operation of the photographing and recording apparatus may be described by noting that the screen 14, closest to the lens 13 will focus light from the strobe 17 at the cross section 10, the farthest from the screen. When this screen 14 is illuminated by the strobe 17 the cross section 10 is brightly lighted by a fine pattern, being the projection of screen 14 on cross section 10. Cross sections 11 and 12 will also be illuminated by strobe light 17, however not by a fine pattern but evenly instead, since the fine pattern of screen 14 is only sharply imaged on cross section 10. The presence of the fine pattern on the cross section one wants to filter out from the background is an essential part of this invention since simply rejecting blurred images would in general not be sufficiently selective. The same holds true for each of the screens 15 and 16 and the cross sections 11 and 12 which are illuminated thereby.

Light reflected from the three cross sections 10, 11 and 12 is directed by the silvered portion of the beam splitter 24 onto the lens 25 and focused by the latter onto the phototube 28. Sharp definition of each cross section is obtained by the movement of the lens 25 under the influence of the transducer 26 which is in turn controlled by the master clock 20. At the same time the other cross sections will be fuzzy and indistinct. Although an alternative to mechanical motion of the large lens 25 will be described later on, it is to be understood as in the spirit of this part of the invention that any lens can be used as lens 25 of which the focal length can be controlled electronically at speeds commensurate with this application that is within times of the order of several milliseconds.

Thus three pictures are taken of the same scene with each picture having a selected cross section at a respective depth focused distinctly and with a fine screen pattern superimposed upon it while the other cross sections are focused indistinctly.

The high pass filter 30 passes only the high frequency components of the electric signal delivered by the pick up tube 28. These components correspond to the fine pattern in the light distribution of the one desired cross section. Filter 30 rejects all low frequencies corresponding to the totality of blurred out of focus cross sections.

The cross sections so filtered are then recorded on film with the help of kinescope type devices 32, 33 and 34. It is obvious that special type kinescopes can be used, which can record pictures faster than that at normal frame rate. In that case one kinescope can project more than one frame on the film so that for example the three kinescopes 32, 33 and 34 of FIG. 1 could be replaced by one fast one.

The film 38 will, of course, advance the distance of three frames and then halt and remain stationary while images of the three cross sections are recorded thereon. It will again advance, stop while three more pictures are recorded, and the cycle repeated.

The functions of the master clock 20 are: to energize the strobe lights 17, 18 and 19 sequentially while the film is halted; to direct the output of the phototube 28 to the kinescopes 32, 33 and 34 in proper sequential order; and adjust the position of the lens 25.

Master clocks are generally well known and it is believed unnecessary to herein illustrate and describe the circuits of such a clock. The illuminating strobe lights do not necessarily have to shine through the large lens 13 onto the scene, but can instead be placed so as to illuminate the scene from the side, not passing through lens 13. In that case beam splitter 24 is not needed.

A logical, important, improvement in the taking apparatus, still based on the same ideas, will now be described.

In the taking setup, depicted in FIG. 1, a movable lens 25 is shown which focuses each of the cross sections sharply on the phototube 28. It is obvious from the foregoing, that one can replace the movable lens by a fixed lens and a set of liquid crystal screens as in FIG. 1a. In the event that it is desired to record the middle cross section 11 shown in FIG. 1, here a stone wall, the position of the liquid crystal screens 26a (equal in number to the number of desired cross sections, here 3) is arranged so that the middle screen is located just where the image of wall 11 is sharply in focus. The signal is then controlled from the master clock 20 so that a voltage is applied across the middle liquid crystal screen, making it light scattering, while the other liquid crystal screens do not receive a voltage and thus remain transparent. A camera lens 25a with a focal length much shorter than the focal length of lens 25 and placed at a greater distance from the liquid crystal screens, focuses the images that the camera lens sees projected by lens 13 shown in FIG. 1 on the liquid crystal screens onto a phototube 28. The basic idea here being that it is not trivial to mechanically move a lens that it may under circumstances be easier to move the screen at which the image is to appear, using the liquid crystal idea.

THE PROJECTING APPARATUS

Referring now more particularly to FIG. 2, the projector will be described. In this connection it is noted that the projector depicted in this figure is designed to accommodate three cross sections and thus conform to FIG. 1. In actual practice the projector will come closer to FIG. 6 which illustrates eight of the screens for reproducing eight cross sections.

It is intended that the projected scene be viewed from the area 40 which bears the legend "Audience." Spaced from the front of the area 40 an appropriate distance is a large lens 41 of a required focal length. For applications in which the three dimensional space is confined, lens 41 may be omitted. On the side of the lens 41 opposite to the audience side are a plurality of screens identified in their entireties by the reference characters A, B and C. They are arranged in depth, that is at progressively greater distances from the area 40. In order to clarify the function and arrangement of the screens a short introduction seems in order.

The purpose of the first half of this invention was to obtain a series of optical cross sections of a scene as was described in the section on recording apparatus. Once a series of optical cross sections has been collected, one wants to project these on screens so that the cross sections are reproduced for the audience just as they were located in the original scene. One purpose of this invention is to give a detailed description of an assembly of normally transparent screens, which one can bring into a light scattering state by application of a voltage so that a light distribution projected, thereon can be viewed. By applying the voltage that causes a screen to become light scattering successively to all screens in the assembly, a three dimensional scene can be created. However, such a scene would not have the desired solidness since from some points in the audience light from some further away object would be seen to shine through objects existing in the foreground.

Systems with this property may be quite useful for various applications and are intended to be included in the following detailed description.

However, it is the intention of the following to describe a more complex screen that has the properties that (a) the screen is transparent when screens between it and the audience are illuminated with optical cross sections (b) the screen becomes light scattering when a voltage is applied to it, which is done at the time an optical cross section is projected on that screen; (c) the screen is left in a state that light is absorbed by it in those parts that received light during the projection of the optical cross section on it, while the parts of the screen that did not receive light are left in a transparent state. The screen remains in this state until the screens between the screen under discussion and the screen furtherest away from the audience have been addressed after which the screen under discussion becomes completely transparent.

This state lasts until the projection system has illuminated all the screens between the audience and the particular screen, after which the cycle repeats itself.

In the prefered embodiment of such a screen, the screen changes automatically its absorbing properties, that is; wherever the cross section projected on a screen contained light, the screen is left in an absorbing state while the more backwards screens are illuminated.

It will be described in detail how this is done.

In FIG. 2 a master clock is shown at 42. A line 43 extends from the master clock 42 to the screen A, a second line 44 goes from the clock 42 to the screen B, and a third line 45 to the screen C. A series (three) of projector lamps are shown at 46, 47 and 48. A line 49 extends from the master clock 42 to the lamp 48, a second line 50 to the lamp 47, and a third line 51 to the lamp 46.

Spaced from and between the projector lamps and between the latter and the screen C are three projection lens systems 52, 53 and 54, adjusted to project in focus images on respectively screens A, B and C.

A pair of spools are shown at 39 (FIG. 1) and 9. The spool 39 constitutes the film supply and the spool 9 is the takeup spool. Thus the film 38 of FIG. 1 is originally supplied on the spool 39 and passed between the projector lamps 46, 47 and 48 on one side and the projection lenses 52, 53 and 54 on the other side. The film is moved with a stepped motion so that three of the frames are moved into this position on each step of movement of the film.

Each of the screens A, B or C has the capability of being either transparent or in a partially opaque condition that is herein referred to as blocking condition or in a light scattering condition. In the latter condition an image may be projected thereon and viewed from the audience side. The latter condition is achieved by impressing a voltage across the screen as will be later described.

In actual use the screen fartherest from the audience, in FIG. 2 screen C, needs only the transparent or the light scattering condition which permits an image to be projected thereon and be visible from the area 40. Thus relating FIG. 2 to FIG. 1 screen C would take the image of cross section 10. Screen B would then be momentarily imparted the same condition to have cross section 11 projected thereonto and then screen A would be conditioned to receive cross section 12.

In operation the master block 42 controls the illumination of the projector lamps 46, 47 and 48 and the conditioning of the screens A, B and C. Devices such as projector lamps, electronic screens and master clocks are well known and the details of such elements are, therefore, not herein illustrated or described.

Figure 4:
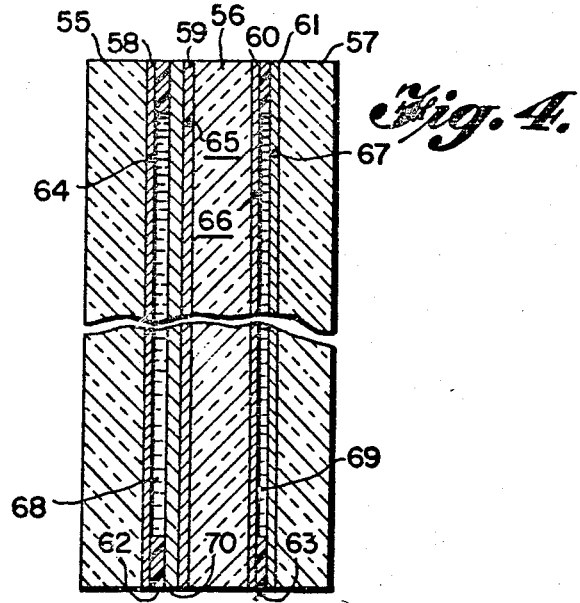
FIG. 4 is a cross section, taken on an enlarged scale, through a screen, being taken about on the plane represented by the line 4—4 of FIG. 3.
Figure 5:
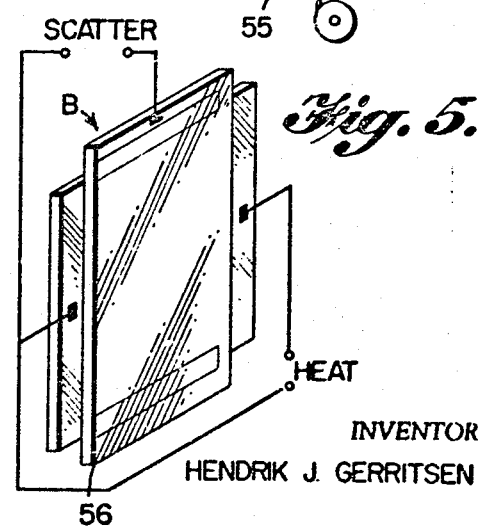
FIG. 5 is a diagrammatic perspective of a screen.

As mentioned above the screens A, B and C must have the ability to be either transparent or in a light scattering condition so that an image may be projected thereon or in a condition that parts of the surface absorb light thus blocking background objects. To impart these properties to the screens a construction such as illustrated in FIGS. 3, 4 and 5 may be taken as exemplary.

Thus part of screen B comprises two plates 55 and 56 of a transparent material such as glass, quartz or polystyrene, while the other part of the screen (FIGS. 3 and 4) consist of plate 56 and another plate 57. A coating of a transparent conducting material such as tin oxide (known as Nesa or Tic) is applied to each of confronting surfaces of the plates 55, 56 and 57. Thus the screen B includes the confronting coatings 58 and 59 and the coatings 60 and 61.

To enable the plates 55 and 56 to define chambers or spaces therebetween, a spacer 62 is positioned therebetween. This spacer is comparatively thin and may be of Mylar, Teflon or mica. It extends over areas immediately adjacent to the free edges of the plates as illustrated. Another spacer 63 is positioned between the plates 56 and 57 to define another chamber.

As a voltage must be impressed across each of the screens the conductive coatings are provided with contacts for effecting an electric connection therewith. Thus the coating 58 is provided with a contact 64, the coating 59 with contact 65, the coating 60 with contact 66, and the coating 61 with a contact 67.

The chamber of screen B defined by coated plates 55 and 56, and spacer 62 is filled with liquid crystals designated 68. The other chamber of screen B defined by coated plates 56 and 57 and spacer 63 is also filled with liquid crystals indicated at 69. The first type liquid crystals are light absorbing, only slightly without an electric field applied across them but strongly with an electric field applied.

The liquid crystal 69 is in its normal, nematic condition transparent. However, when in its nematic phase an electric field is applied across it, the liquid crystal scatters light. There are many liquid crystals that have such a nematic phase. Among them might be mentioned: p-azoxy anisol, p-methoxy cinnamic acid, anisaldazin, p-azoxy phenetol, p-n butyl oxy benzoic acid, ethoxy-benzalazin and others as well as mixtures between those. The liquid crystal 68 may be rendered either slightly or strongly absorbing by adding a colored liquid crystal or a light absorbing material, with the degree of absorbing properties depending on the voltage applied. The reason for this is that without a voltage and at a temperature so that liquid crystal 68 is in its nematic state, the liquid crystal is not scattering and slightly light absorptive. When an electric field is applied, the crystal scatters light and light that undergoes multiple scattering will now be absorbed strongly.

A layer of a photoconductor is shown at 70. It is transparent for visible light but sensitive to U.V. ZnS and ZnO among other materials fulfill these conditions. If the larger sensitivity often associated with a longer wavelength is used, the photoconductor 70 should cover only small areas of the screen so as not to obscure the picture.

FIG. 5 illustrates, diagrammatically, how a voltage is applied across one sheet, for example 55, to achieve a desired temperature for the liquid crystals and which temperature is maintained to keep the liquid crystal in the nematic phase for absorbing arisole for example is from 116° to 134° C. The nematic phase is made to scatter light when a voltage of the required strength is impressed across the plates 55 and 56 as depicted in FIG. 5.

FIG. 3 illustrates in somewhat more detail the electronic devices and wiring diagram of the schematic outline of FIG. 2. Thus, a power source is shown at 75. A bus line 76 extends from one side thereof. Three lines 77, 78 and 79 are connected to the other side. Resistors 80, 81 and 82 are included in these lines 77, 78 and 79 which are connected to the bus line 76. Light source 48a illuminates the film and generates synchronization signals in the three oppositely placed photocells 21, 22 and 23. The resulting voltages go to the liquid crystal screens and to the power amplifier shown at 83, ensuring that at the proper moment the proper strobe light flashes on. This kind of film based synchronization constitutes a preferred form of synchronizing. A line 84 is connected at one end to amplifier 83 and at its other end to the line 77 on the side of resistor 80 remote from bus line 76. Another line 85 is connected at one end to line 78 on the side of resistor 81 remote from bus line 76 and at its other end to a line 86. One end of the latter goes to the amplifier 83. A line 87 has one end connected to line 79 on the side of resistor 82 remote from bus line 76 and at the other to a line 88 one end of which goes to amplifier 83. Bus line 76 is connected to a line 89 one end of which goes to amplifier 83.

From the amplifier 83 four lines 90, 91, 92 and 93 are connected to lamps 46, 47 and 48 to provide a complete circuit for each lamp in a well known manner.

An Adder Isolator 94 is connected by a line 95 with the contact 64 of screen A. Lines 86 and 88 are also connected to isolator 94. Line 86 also is connected to the master clock 42 contacts from lines 84, 85 and 87; lines 96, 97 and 98 go to the contacts 65 of screens A and B and contact 67 of screen C. Line 89 is connected to contacts 66 and to the photoconductor 70 of screen A and B.

It is evident that each of the screens A and B or as many as may be included includes three essential layers. These are: regular liquid crystals such as provided in the chambers between one pair of plates in the screen and a photoconductor layer 70 and light absorbing liquid crystals in the other chamber of that screen.

A method for determining the number of screens required in any particular set of conditions is set forth as follows with reference to FIG. 7. Let $z_1$ and $z_2$ be two distances such that their depth differences $z_2 - z_1$ can just not be resolved by the eye. The eye can resolve elements separated by angles larger than $$\delta\theta = \frac{\lambda}{d} \text{ radian}$$

where $\lambda$=wavelength of light and $d$=pupil diameter. If we denote the separation of the two eyes by $e (e = 6$ cm.) we see from the figure that $$z_2 - z_1 = z_1 \cdot z_2 \frac{\lambda}{d \cdot e}$$

which equals approximately $10^{-4} z_1 \cdot z_2$ where all lengths are expressed in cm. Let us rewrite the expression as $$\frac{1}{z_1} - \frac{1}{z_2} = 10^{-4}$$

or in general:

$$\frac{1}{z_n} - \frac{1}{z_{n+1}} = 10^{-4}$$

From this follows immediately that $$\frac{1}{z_1} - \frac{1}{z_n} = (n-1)10^{-4}$$

In case that $z_1 = 10$ meter and $z_2$ is at infinity, one sees that the number of cross sections one can just distinguish is 10 which would be the maximum number of screens one would consider using. For the case of a small console with $z_1 = 50$ cm. and $z_2 = 100$ cm. one would ideally need $n = 100$ but could probably do with a lot less.

Figure 6:
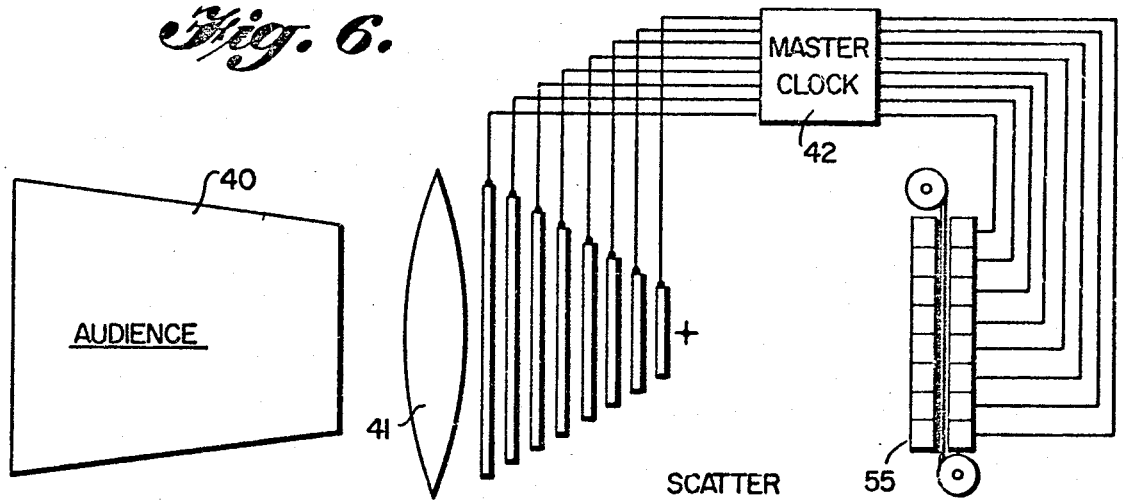
FIG. 6 is a view generally similar to FIG. 2 depicting the inclusion of a larger number of screens.

FIG. 6 is believed to be substantially self explanatory. Such elements as the area 40, lens 41 and master clock 42 are the same as in FIG. 2. However, the number of screens (three of FIG. 2) have been increased to eight in FIG. 3. This, of course, entails a corresponding increase in the number of projector lamps, electronic screens, and connecting lines to the master clock. Needless to say, the photographing and recording apparatus will supply the corresponding number of cross sections in the scene to be projected.

While preferred specific embodiments of the invention are herein set forth, it is to be clearly understood that the invention is not to be limited to the exact mechanisms, devices, and materials illustrated and described because various modifications of these details may be provided in putting the invention into practice within the purview of the appended claims.

What is claimed is:
1. In three dimensional optical recording and projecting apparatus; photographing and recording mechanism comprising: means for individually photographing more than two cross sections of a scene in depth and in sequential order, and means for recording, in said order, the images of said sections on a film; and projecting apparatus for said film, said projection apparatus including: a plurality of screens arranged in depth and corresponding in number of the number of cross sections to be reproduced, at least two of said screens being either transparent or in a scattered light condition; a projector lamp for each of said screens, means for positioning said film between said lamps and said screens, and timing mechanism for co-relating illumination of each of said lamps to the light scattering condition of the screen receiving the image projected thereonto by said lamp each screen being rendered light scattering when the lamp projecting an image intended for said screen is illuminated.

2. The apparatus of claim 1 together with a plurality of individual light sources each of which is operative to illuminate one of said cross sections to the exclusion of the other cross sections, and timing mechanism co-relating said light sources to said photographing and recording means each cross section being illuminated when the photographing and recording means for individually photographing and recording that cross section is operating.

3. The apparatus of claim 1 in which the photographing means includes a movable lens, individual light sources for illuminating each of said cross sections to the exclusion of the others, and timing mechanism for co-relating the position of said lens to the light source in effect and said recording means each cross section being illuminated when the movable lens is positioned to focus on that cross section and said recording means for that cross section is operative.

4. The apparatus of claim 1 together with a lens on the side of said screens remote from said projector lamps.

5. In three dimensional optical apparatus, photographing and recording apparatus comprising: a lens adapted to be positioned in front of a scene to be photographed, a beam splitter on the side of said lens remote from said scene, said beam splitter including a transparent section and a reflecting section, more than two individual light sources on the side of said beam splitter remote from said lens, there being a light source for each cross section of said scene, a master clock controlling illumination of said light sources, a movable lens receiving light from the scene reflected on said lens by said beam splitter, mechanism controlled by said master clock for moving said lens to a position in which it projects a sharply focused image of one cross section of said scene onto an image tube located behind said lens in the image space, said master clock co-relating activation of one of said light sources to one of the positions of said movable lens, said co-relation representating activation of each of said light sources subsequently illuminating sharply different cross sections of said scene with corresponding positions of said movable lens sharply imaging each of said cross sections onto an image tube, said co-relation being effected by said master clock, a plurality of kinescopes corresponding in number to that of said light sources and to said positions of the movable lens, and a film recording images from said kinescopes, the operation of said kinescopes being controlled by the master clock each kinescope being in operation when the corresponding light source is illuminating a sharply different cross section of the scene.

6. The apparatus of claim 5 in which each light source is a stroboscopic light together with a light screen between each stroboscopic light and said beam splitter.

7. The apparatus of claim 5 in which the lens moving means is a transducer electrically connected to said master clock.

8. The apparatus of claim 5 together with film mounting and moving mechanism for moving said film past said kinescopes with a step by step motion, each step comprising a length of film on which is recorded images of the cross sections of each scene photographed.

9. The apparatus of claim 5 in which there is a high frequency pass filter between said phototube and said master clock.

10. In three dimensional optical apparatus, photographing and recording means comprising: a lens adapted to be positioned in front of a scene to be photographed, a beam splitter on the side of said lens remote from said scene, said beam splitter remote from said lens, there being a light source for each cross section of said scene, a master clock controlling illumination of said light sources, co-related in sequential order with a plurality of liquid crystal screens corresponding in number to the number of said light sources, mechanism controlled by said master clock for applying a voltage to one of said liquid crystal screens corresponding to the particular light source in effect, a plurality of kinescopes corresponding in number to said light sources, a phototube between said liquid crystal screens and said kinescopes, and a film recording images from said kinescopes, the operation of said kinescopes being controlled by said master clock, each kinescope being in operation when the corresponding light source is illuminating a liquid crystal screen to which a voltage is applied.

11. In three dimensional optical apparatus, projecting mechanism comprising: a viewing area, a lens in front of said viewing area, a plurality of screens of a number in excess of two on the side of said lens remote from said viewing area and arranged in spaced depth relation, each of said screens having the properties of either transparency or a light scattering condition when a voltage is impressed thereacross, with the latter enabling the screen to have an image projected thereonto and seen from the viewing area, a plurality of projector lamps corresponding in number to said screens, a master clock electrically connected to said screens and lamps and controlling the conditioning of the screens and illumination of the lamps each screen having a voltage impressed thereacross when the corresponding lamp is illuminated; and means for positioning a film in front of said lamps and between the latter and said screens.

12. The mechanism of claim 11 together with film mounting and moving means for positioning a film in front of said projector lamps and moving the film with a step by step movement.

13. The mechanism of claim 11 in which each of said screens is a liquid crystal screen that is in the nematic phase and when a voltage is impressed thereacross said light scattering condition is achieved.

14. The mechanism of claim 11 in which each of said screens includes a chamber defined by a pair of spaced transparent plates with the chamber filled by liquid crystals in the nematic phase and made light scattering when a voltage is impressed thereacross.

15. The mechanism of claim 11 in which each of said screens except the one most remote from the viewing area consists of two cells, one containing a liquid crystal in the nematic phase and which changes its state from transparency to light scattering upon application of a voltage thereto, the other cell containing a light absorbing liquid crystal in series with a photoconductor, said last mentioned cell having the ability to absorb light and create a solid effect at those parts that were illuminated and if a voltage is simultaneously applied across the combination of photoconductor and absorbing liquid crystal.

References Cited
UNITED STATES PATENTS 3,006,241  10/1961  Marks _____ 352—86X JOHN M. HORAN, Examiner U.S. Cl. X.R.

352—43, 86; 353—121